United States Patent [19]

Kashiwagi et al.

[11] 4,341,463
[45] Jul. 27, 1982

[54] IMAGE REPRODUCING APPARATUS

[75] Inventors: Kazuo Kashiwagi, Tokyo; Toshio Arai, Kawasaki; Takao Toda, Tokyo; Masanari Shirai, Chigasaki; Masaaki Yanagi, Kawasaki, all of Japan

[73] Assignee: Canon Kabushiki Kaisha, Tokyo, Japan

[21] Appl. No.: 228,721

[22] Filed: Jan. 27, 1981

[30] Foreign Application Priority Data

Feb. 5, 1980 [JP] Japan .................................. 55/12691
Jan. 6, 1981 [JP] Japan ..................................... 56/566

[51] Int. Cl.³ ............................................ G03G 15/00
[52] U.S. Cl. ................................. 355/14 CH; 355/5; 355/14 D
[58] Field of Search ............ 355/14 CH, 3 CH, 14 D, 355/14 E, 5, 44, 45

[56] References Cited

U.S. PATENT DOCUMENTS 3,674,354  7/1972  Artaud et al. ........................... 355/5
3,738,744  6/1973  Cassano et al. ...................... 355/5 X
3,992,089 11/1976  Hirose et al. ........................... 355/5

Primary Examiner—R. L. Moses
Attorney, Agent, or Firm—Fitzpatrick, Cella, Harper & Scinto

[57] ABSTRACT

This invention provides an apparatus for reproducing image from a microfilm, in which a microfilm having a negative or positive image is illuminated by illuminating image and projecting thus illuminated microfilm image onto a photosensitive member. The reproducing apparatus is provided with a charger for positively or negatively charging the surface of the photosensitive member, measuring device for measuring the light intensity from thus illuminated microfilm, and charge controller for selecting the polarity of charge to be given to the photosensitive member in response to the result of measurement by the measuring device thereby providing a positive reproduced image regardless whether the image on the microfilm is negative or positive. In another embodiment the apparatus is provided with development controller for selecting toner for image development on the photosensitive member in response to the result of measurement by the measuring device.

13 Claims, 8 Drawing Figures

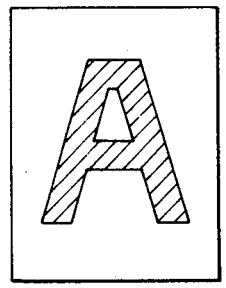
FIG. IA
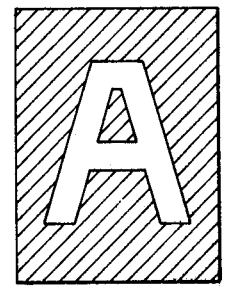
FIG. IB
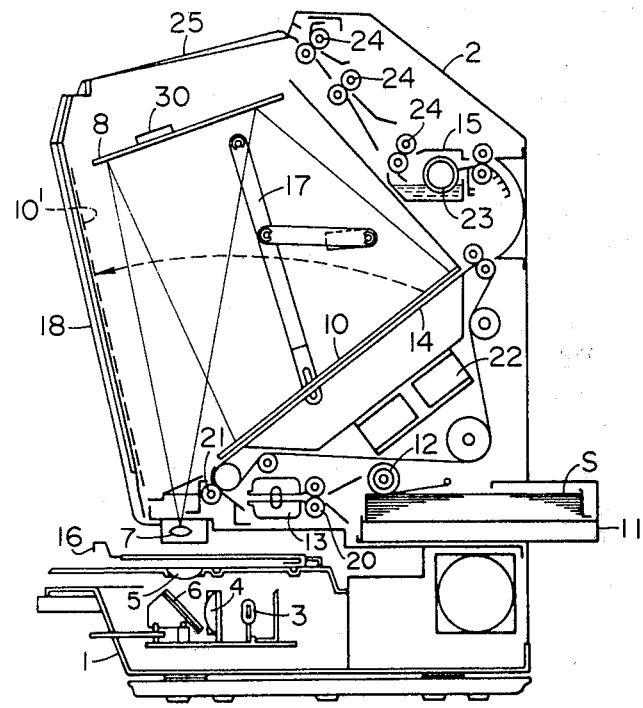
FIG. 2

IMAGE REPRODUCING APPARATUS

BACKGROUND OF THE INVENTION

1. Field of the Invention

The present invention relates to an image reproducing apparatus for obtaining a positive reproduced image from a microfilm having a negative or positive image.

2. Description of the Prior Art

In an electrophotographic copying of a microfilm image, an ordinary image development is employed for obtaining a positive reproduced image from a positive microfilm image as shown in FIG. 1A while a so-called reserved development is employed for obtaining a positive reproduced image from a negative microfilm image as shown in FIG. 1B.

The normal development is achieved by charging a photosensitive sheet for example an electrofax sheet having a zinc oxide coating on a substrate in a polarity opposite to the polarity of the toner, and applying said toner onto an electrostatic latent image formed on the photosensitive sheet. On the other hand the reversed development is achieved by charging a photosensitive sheet in a polarity same as that of the toner and applying said toner to an electrostatic latent image formed on said photosensitive sheet. In such conventional electrophotographic apparatus it has been necessary to select the polarity of charging for the photosensitive member according to whether the image on the microfilm is negative or positive. Such polarity selection has been conducted manually by switches after the microfilm image visually identified as positive or negative, but such apparatus has been associated with the troubles of erroneous or forgotten switching.

SUMMARY OF THE INVENTION

The originals to be recorded on microfilms are mostly composed of characters and drawings. In case such originals are recorded under substantially same conditions on positive and negative microfilms and illuminated by a same lamp, the light transmission of microfilms having positive images is approximately 7 times larger than that of microfilms having negative images. It is therefore possible to know the background or base density of a microfilm by measuring the transmission of an image area of a suitable arbitrary dimension, and to identify if the microfilm is negative or positive by comparing said base density with a determined value.

The present invention therefore provides an image reproducing apparatus capable of identifying if the recorded image is negative or positive by measuring the transmission (or reflection) of an image recorded on a microfilm and comparing the measured value with a determined reference value, and further capable of controlling the charging unit or developing unit according to thus obtained identification signal.

Said measurement is achieved by illuminating an image to be reproduced and by measuring the optical transmission or reflection of the entire image or a part thereof directly or indirectly with a measuring unit provided with a photoelectric converting element. The output voltage of said photoelectric converting element is compared with a determined reference voltage, and whether the image is negative or positive can be identified from the magnitude relationship of said voltages. Said reference voltage is determined according to the photoelectric converting element and the base density of microfilm to be employed. The area of measurement should preferably be taken as wide as possible in the image, but it is possible also to measure plural areas in the image and to use the average value of said measurements.

Now the present invention will be clarified in detail by the following description to be taken in conjunction with the attached drawings.

BRIEF DESCRIPTION OF THE DRAWINGS

FIGS. 1A and 1B are plan views respectively of a microfilm having a positive image and a microfilm having a negative image;

FIG. 2 is a schematic view of a reader-printer embodying the present invention;

DETAILED DESCRIPTION OF THE PREFERRED EMBODIMENTS

Figure 3:
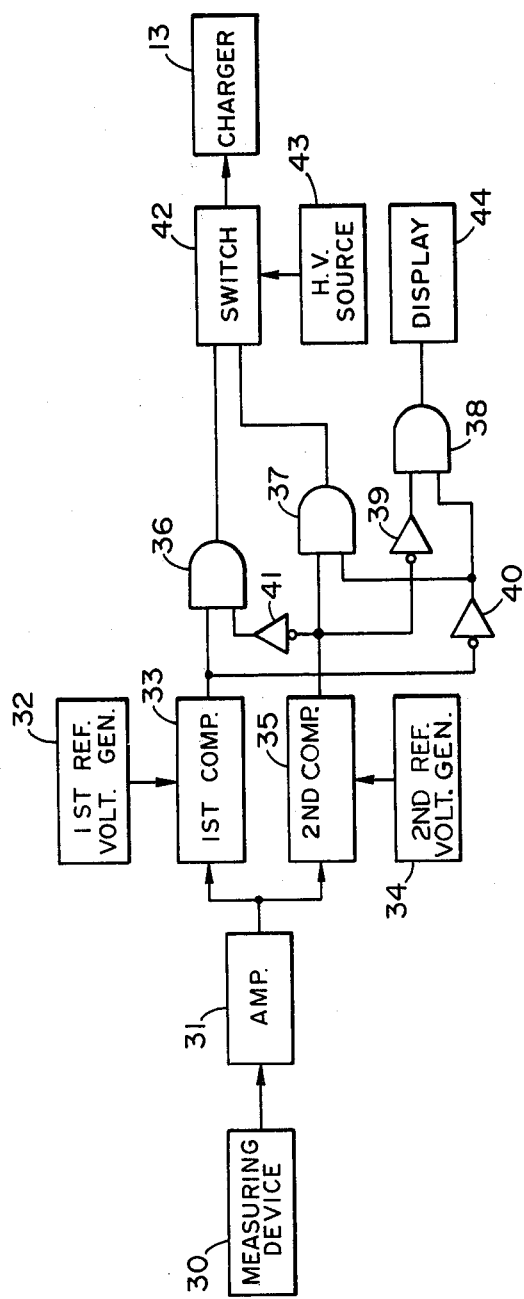
FIG. 3 is a block diagram of a charge control circuit.

FIG. 2 shows a reader-printer embodying the present invention and composed of a lower casing 1 and an upper casing 2, said lower casing 1 being provided therein with illuminating means having an illuminating lamp 3, condenser lenses 4, 5 and a mirror 6. Said upper casing 2 is provided therein with an optical system having a projecting lens 7 and a half-mirror 8, a reflective screen 10, a cassette 11 containing plural copy sheets (photosensitive sheets) S in a stack, a feed roller 12 for sheet-by-sheet advancement of said copy sheets from the cassette 11, a charger 13 for uniformly charging said copy sheet either positively or negatively, a conveyor belt 14, a developing unit 15 and related elements. Between said condenser lens 5 and said projecting lens 7 there is provided a fiche carrier 16 having paired glass plates for supporting a microfiche and arbitrarily displaceable perpendicularly to the optical path. Said fiche carrier 16 is rendered displaceable along the upper face of the lower casing 1 thereby bringing a desired image of the microfiche into the optical path.

The reflective screen 10 is displaceably supported by a crank lever mechanism 17 by means of which the screen is displaced from an exposure position (full-lined position in FIG. 1) for receiving the light beam reflected by the half-mirror 8 to a position (broken-lined position 10' in FIG. 1) for closing an observation aperture 18 of the upper casing 2. Such screen displacing mechanism is already disclosed in detail in the U.S. Pat. No. 4,054,379, and is activated by a motor in response to the actuation of an unrepresented copy button. As the copy sheet S employed is so-called electrofax paper having a zinc oxide coating on a substrate. When the apparatus is shifted from the reading mode to the print mode by displacement of the screen 10 to the aperture closing position 10', the feed roller 12 is rotated to advance the copy sheet S from the cassette 11. Said copy sheet is advanced by the feed roller 20 to the charging unit 13, uniformly charged therein either positively or negatively, and further advanced by a feed roller 21 to the conveyor belt 14 which is composed of an endless belt having plural holes and triangularly supported by three rollers for driving said belt in the print mode. Inside said belt there is provided a suction unit 22 for supporting the copy sheet on the surface of said belt 14, whereby said copy sheet S is transported by suction with said conveyor belt 14. Upon arrival of the copy sheet at the exposure position, the conveyor belt 14 is stopped and the lamp 3 is lighted for a determined period to expose the copy sheet to the image on the microfilm. Upon completion of the exposure, the copy sheet bearing thereon an electrostatic latent image corresponding to said microfilm image is again transported by the conveyor belt 14 to the developing unit 15, then subjected to image development by a developing roller 23 with toner of a determined charge, and ejected to a tray 25 by means of a squeeze-eject roller 24. After said ejection the crank lever mechanism 17 is again activated to return the reflective screen 10 to the original exposure position thereby restoring the reading mode.

Behind the half-mirror 8 provided is a measuring unit 30 having a photoelectric converting element for generating a voltage signal in response to the light received through the microfilm image and said half-mirror. Said photoelectric converting element should preferably be provided with a light-receiving area as large as possible, but it is also possible to provide plural converting elements for obtaining an averaged voltage. Such photoelectric converting element can be composed for example of a phototransistor, a photodiode or a solar cell.

FIG. 3 shows a charge control circuit provided with an amplifier 31 for amplifying the output voltage from the measuring unit 30, a first reference signal generator 32 for generating a first reference voltage signal, a first comparator 33 for comparing said first reference signal with the output signal of the measuring unit and adapted to release a logic-1 signal in case the latter signal is larger, a second reference signal generator 34 for generating a second reference voltage signal lower than said first reference voltage signal, and a second comparator 35 for comparing the second reference signal with the output signal of the measuring unit and adapted to release a logic-1 signal in case the latter signal is lower. In this manner the first comparator 33 releases a positive signal identifying a positive microfilm image in case the light intensity received by the photoelectric converting element 30 exceeds the determined first reference value, and the second comparator 35 releases a negative signal identifying a negative microfilm image in case the light intensity received by the photoelectric converting element 10 is smaller than the determined second reference value which is selected smaller than said first reference value. There are also shown AND gates 36, 37, 38, inverters 39, 40, 41, a switch 42 actuated by the output signals of the AND gates 36, 37, a high-voltage source 43 for applying a positive or negative high voltage according to the state of said switch 42, and a display device 44. The above-mentioned first and second reference voltages are selected according to the photoelectric converting element 30 and the base density of the microfilm, and are rendered manually adjustable.

In case a microfilm having a positive image is utilized as the original in the above-explained circuit, the photoelectric converting element 30 releases an output voltage higher than the first reference voltage to open the AND gate 36 thereby releasing the "positive" signal, in response to which the switch 41 is shifted to apply a high voltage of a polarity opposite to that of the toner from the high-voltage source 42 to the charger 13 thereby charging the copy sheet S in a polarity opposite to that of the toner. Said switch 41 is so structured as to be actuated simultaneously with or prior to the actuation of the copy start button. Consequently the copy sheet is subjected to normal development to provide a positive image thereon.

In case a microfilm having a negative image is utilized as the original, the photoelectric converting element 30 provides an output voltage lower than the second reference voltage to open the AND gate 37 thereby releasing a "negative" signal, in response to which the switch 41 is shifted to apply a high voltage of a polarity same as that of the toner from the high-voltage source 42 to the charger 13, thereby charging the copy sheet S in a polarity same as that of the toner. Consequently the copy sheet S is subjected to reversed development to obtain a positive image.

Also in case the output voltage of the photoelectric converting element 30 is lower than the first reference voltage but higher than the second reference voltage, the AND gate 38 is opened to interrupt the copy sheet feeding by stopping the feed roller 12 and to activate the display device 43 for advising the difficulty in negative-positive identification to the operator.

Such situation is encountered when a special original, such as a photograph, is recorded on the microfilm, in which case the switch 41 is to be manually selected according to the visual identification of the microfilm image by the operator. As ordinary microfilms have a high gamma value suitable for recording documents and drawings but not for recording photographs, automatic microfilm image identification can be conducted in assured manner even if the difference between the first and second reference voltages is selected large.

Figure 4:
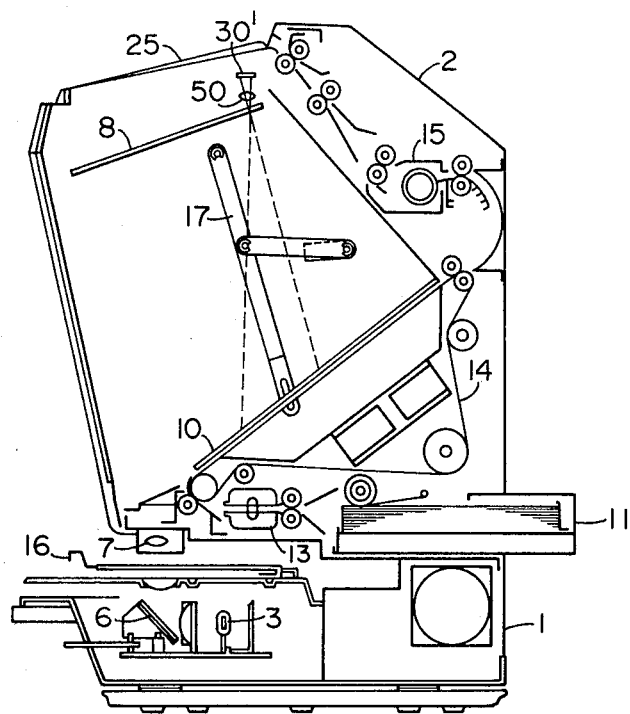
FIG. 4 is a schematic view of a reader-printer showing another embodiment of the measuring device.

FIG. 4 shows another embodiment of the measuring unit, wherein a lens 50 and a photoelectric converting element 30' are positioned behind the half-mirror 8 for receiving the light projected onto and reflected by the screen 10, thereby indirectly measuring the transmission of the original image.

The method of light measurement is however not limited to the foregoing but can also be achieved for example by positioning a photoelectric converting element in the exposure position and temporarily lighting the lamp 3 before the copy sheet is advanced to said position in the print mode.

The present invention is applicable not only to the reflection-type reader-printer but also to the transmission-type reader-printer utilizing a transmission screen, and the image-transfer type copying process is similarly usable.

Figure 5:
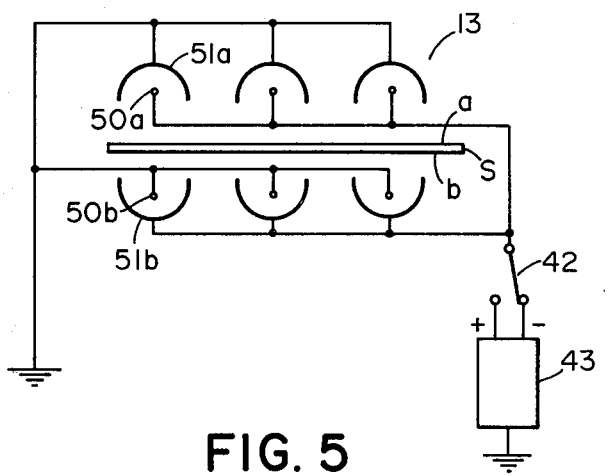
FIG. 5 is a schematic view showing an embodiment of the charging device.

FIG. 5 shows an embodiment of the charger provided with corona electrodes 50a, 50b and auxiliary electrodes 51a, 51b electrically insulated therefrom, said electrodes being so arranged as to face the photosensitive layer (a) and the substrate (b) of the copy sheet S. The auxiliary electrodes 51a at the photosensitive layer side (a) are connected with the corona electrodes 50b at the substrate side (b) while the corona electrodes 50a at the photosensitive layer side (a) are connected with the auxiliary electrodes 51b at the substrate side (b), and either one group of thus connected electrodes is grounded while the other group receives a high voltage from the high-voltage source 43 through the switch 42.

For negatively charging the photosensitive layer of the copy sheet in the foregoing embodiment, the above-mentioned switch 42 is connected to the negative output terminal of the high-voltage source 43. By advancing the copy sheet between the corona electrodes 50a, 50b in this state, the photosensitive layer a is negatively charged by the negative corona discharge from the corona electrodes 50a while the substrate b is positively charge by the positive corona discharge from the corona electrodes 50b.

Also in case the switch 42 is shifted to the positive output terminal of the high-voltage source 43, the photosensitive layer a and the substrate b of the copy sheet are respectively charged positively and negatively. Naturally the charger is not limited to the foregoing embodiment but various known chargers are applicable for the purpose.

Figure 6:
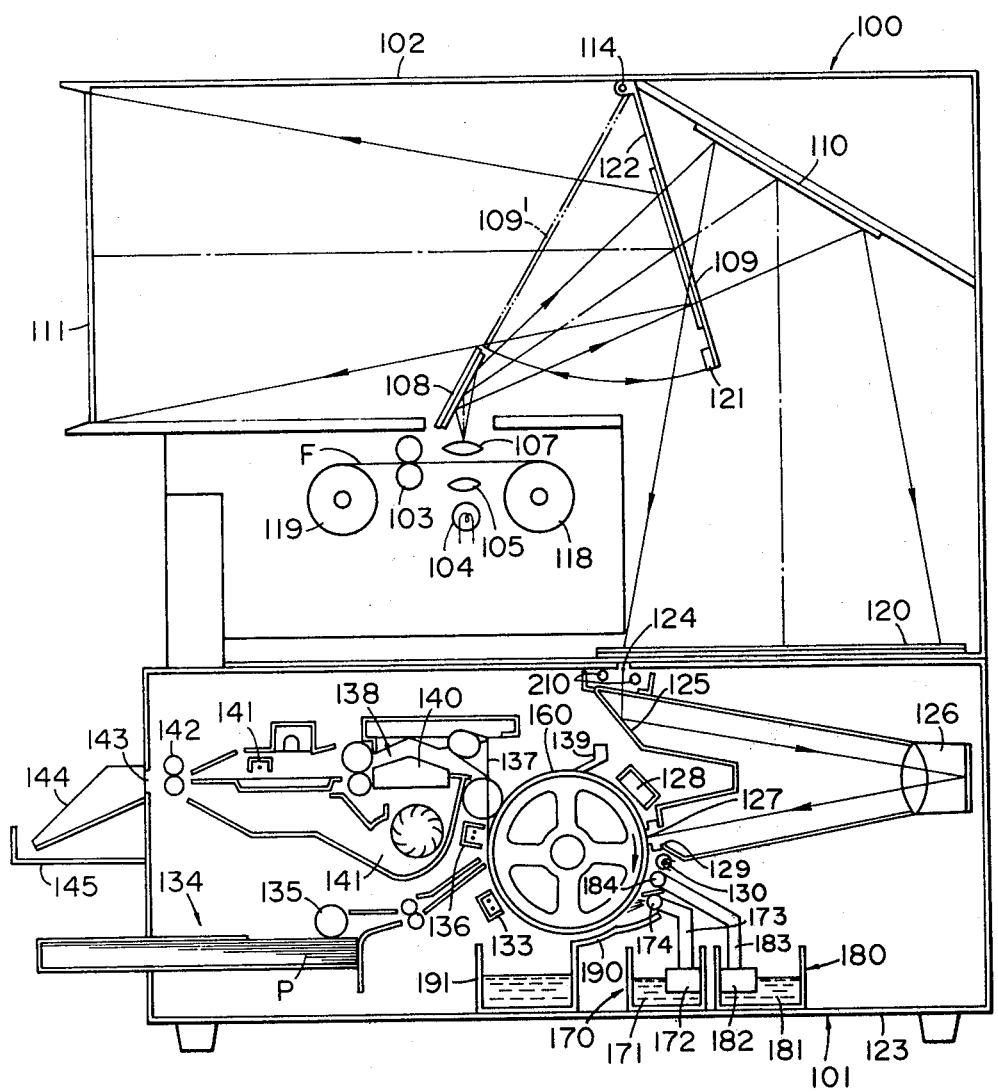
FIG. 6 is a view showing another embodiment of the present invention.

FIG. 6 shows a copying apparatus representing another embodiment of the present invention, wherein the apparatus is composed of a microfilm projecting unit 100 and a copying unit 101. Said microfilm projecting unit 100 is provided with an upper casing 102, a microfilm feed roller 103, an illuminating unit having a microfilm illuminating lamp 104 and a condenser lens 105, a projection lens 107, a first fixed mirror 108, a movable mirror 109, a second fixed mirror 110 and a screen 111. The illuminating unit is composed as in a known microfilm reader which may be provided with a retrieving mechanism. The image of a microfilm F is projected in enlargement onto the screen 111 through the projection lens 107, first fixed mirror 108 and movable mirror 109, whereby the operator observes the image on said screen 111 and determines the image to be copied. Then the movable mirror 109 is pivoted around an axis 114 to a chain-lined position 109′, whereby the entire microfilm image to be copied is projected onto a Fresnel lens 120 through the first fixed mirror 108 and second fixed mirror 110.

The microfilm in the illuminating unit is rendered displaceable for selecting the frame to be copied and, after said selection, movable at a constant speed by a feed roller 103 for scanning exposure of the image to the photosensitive drum, between a film feed reel 118 and a take-up reel 119. A measuring unit 121 composed of a photoelectric converting element is mounted on a movable plate 112 supporting said movable mirror 121 for measuring the optical transmission of the microfilm while traversing the projection light path when said movable plate 122 is displaced from the full-lined position to the chain-lined position. The lamp 104 is lighted in said displacement, namely during the shift from the reading mode to the copy mode, and it is turned off when the measuring unit is positioned outside the light path.

The aforementioned Fresnel lens 120 is placed on the upper face of a lower casing 123 of the copying unit 101.

Thus, in case of copying a desired frame in the microfilm, the movable mirror 109 is at first displaced to the chain-lined position 109′, and the microfilm F is moved at a constant speed by the feed roller 103 while the lamp 103 is lighted. The optical image of the microfilm projected on said Fresnel lens 120 is guided through a slit 124, a mirror 125 and an in-mirror lens 126 and projected in an exposure station 127 onto a photosensitive drum 160 rotated at a constant speed. Said drum is provided with a cylindrical photoconductive layer covered with a transparent insulating layer. Said drum is rotated in a direction of the arrow, and is exposed to the image of the microfilm F advanced in synchronization with said drum. Said drum 160 is at first uniformly charged positively by a primary charger 128 receiving a high voltage from a high-voltage source, then subjected to AC charge elimination by a charge eliminator 129 receiving an AC voltage simultaneously with the slit exposure of the microfilm image in the exposure station 127, and is flush exposed to a lamp 130 to form an electrostatic latent image on said drum. However the above-explained process may be so modified as to conduct a secondary charging step simultaneously with the image exposure instead of the AC charge elimination or to conduct the secondary charging step immediately after the image exposure.

The electrostatic latent image thus obtained is developed with a liquid developer in a first developing station 170 or a second developing station 180.

In the first developing station 170, a liquid developer 171 containing negatively charged toner is elevated by a pump 172 and emitted from a pipe 173 having a nozzle 174 towards the photosensitive drum 160 thereby conducting a normal development of the electrostatic latent image.

In the second developing station 180, a liquid developer 181 containing positively charged toner is elevated by a pump 182 and emitted from a pipe 183 having a nozzle 184 towards the photosensitive drum 160 thereby conducting a reversed development of the electrostatic latent image. There are also provided a developing tray 190 and a container 191 for the recovered developer.

After the image development, the photosensitive drum 160 is subjected to squeezing of excessive liquid developer without affecting the developed image by a positive corona discharge by a post-charger 133. A copy sheet P supplied from a paper feed section 134 by a roller 135 is brought into contact with the photosensitive drum 160, and, after image transfer by positive corona discharge from a charger 136, is separated by a separating belt 137 and guided to a drying-fixing station 138. Said transfer sheet P is advanced at a speed identical with the peripheral speed of the photosensitive drum 160.

After image transfer, the photosensitive drum 160 is subjected to removal of remaining toner and developer by a blade cleaner 139 and is thus prepared for the succeeding imaging cycle. The transfer sheet P is heated by a heater 140, then subjected to drying and image fixing by hot air blown around the heater 140 from a duct 141, and, after the removal of remaining charge by a charge eliminator 141, ejected onto a tray 145 or an auxiliary tray 144 through an eject roller 142 and an outlet 143. After the image exposure onto the photosensitive drum, the microfilm is reversed to the original position. Thus it is possible to obtain multiple copies from the same original by repeating the foregoing procedure, or to obtain a copy of another microfilm frame through a similar operation as explained in the foregoing.

Figure 7:
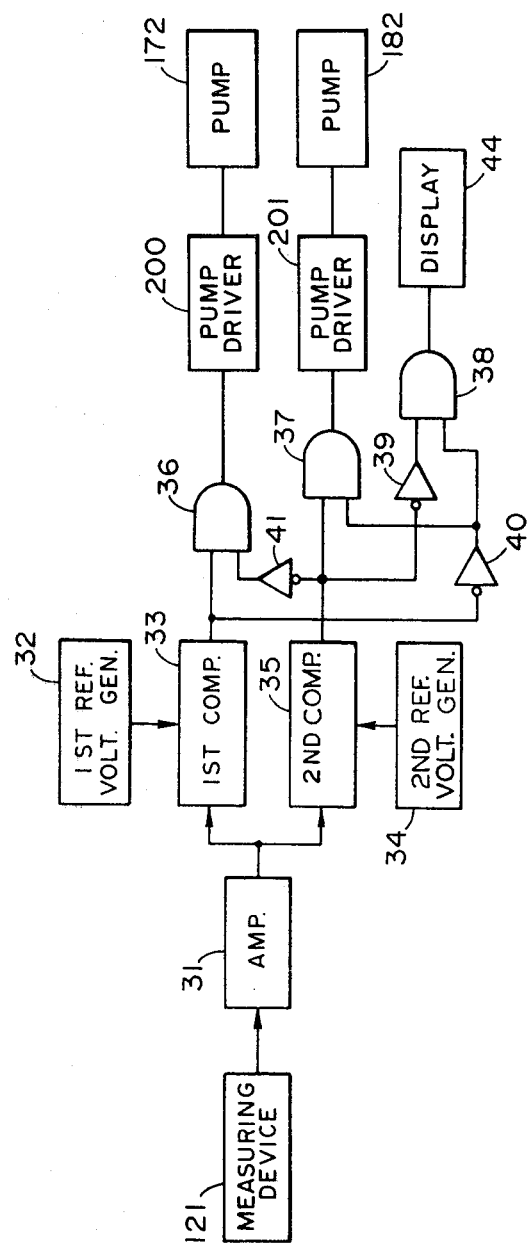
FIG. 7 is a block diagram showing a development control circuit.

FIG. 7 shows a development control circuit, wherein the elements of the same functions as shown in FIG. 3 are represented by the same numbers. Said circuit is provided with a pump driver circuit 200 for driving the pump 172 of the first developing station 170 and a pump driver circuit 201 for driving the pump 182 of the second developing station.

In this circuit, the "positive" signal released from the AND gate 36 drives the pump 172 through said pump driver circuit 200 to cause emission of the liquid developer 171 to the photosensitive drum 160.

On the other hand, the "negative" signal released from the AND gate 37 drives the pump 182 through said pump driver circuit 201 to cause emission of the liquid developer 181 to the photosensitive drum 160. In this manner there is conducted a normal development or a reversed development respectively when the microfilm image is positive or negative, thus automatically providing a positive reproduced image. In case the output voltage of the measuring unit 121 is lower than the first reference voltage and higher than the second reference voltage, the display device 43 is activated and the copying operation is prohibited by the output signal of the AND gate 38.

In the embodiment shown in FIG. 6, it is also possible to enlarge the function of the apparatus also as a document copier by forming the upper casing 102 as a microfilm copying attachment detachable from the lower casing 123 and replacing the Fresnel lens 120 by an original carriage to be reciprocated along the upper face of the lower casing 123 in synchronization with the photosensitive drum 160 when the upper casing 102 is detached. 210 is a document illuminating lamp.

As explained in the foregoing, the present invention, being capable of selecting the polarity of charging on the photosensitive member or the polarity of toner for latent image development in response to the amount of light received from the illuminated microfilm, allows to automatically provide a positive reproduced image regardless whether the microfilm image is positive or negative, thus simplifying the copying operation and avoiding the errors therein.

Naturally the present invention is applicable also to the copying process utilizing dry toner instead of liquid developer.

What we claim is:

1. An image reproducing apparatus, comprising:
   illuminating means for illuminating a microfilm having recorded images therein;
   charging means for positively or negatively charging a photosensitive member;
   optical means for projecting an image of the microfilm illuminated by said illuminating means onto said photosensitive member;
   measuring means for measuring the amount of light from the microfilm illuminated by said illuminating means; and
   charge control means for selecting the polarity of charge to be given to said photosensitive member in response to the result of measurement by said measuring means.

2. An image reproducing apparatus according to the claim 1, wherein said charge control means comprises means for generating a reference signal, comparator means for comparing the reference signal from said reference signal generating means with the output signal from said measuring means, and means for controlling said charging means in response to the output signal from said comparator means.

3. An image reproducing apparatus according to the claim 2, wherein said reference signal generating means comprises first means for generating a first reference voltage and second means for generating a second reference voltage lower than said first reference voltage, and said control means being adapted to control said charging means in such a manner that the charge to be given to the photosensitive member when the voltage given by said measuring means corresponding to the measured light amount exceeds said first reference voltage is opposite in polarity to the charge to be given to photosensitive member when the measured voltage is lower than said second reference voltage.

4. An image reproducing apparatus according to the claim 3, wherein display means is activated when the voltage given by said measuring means corresponding to the measured light amount is positioned between said first and second reference voltages.

5. An image reproducing apparatus according to the claim 1, wherein said charging means comprises corona discharge means.

6. An image reproducing apparatus according to the claim 1, wherein said charging means comprises corona discharge means.

7. An image reproducing apparatus according to the claim 1, further comprising a reflective screen on which the microfilm image is projected, wherein said measuring means is adapted to measure the light reflected by said screen.

8. An image reproducing apparatus, comprising:
   illuminating means for illuminating a microfilm having recorded images thereon;
   charging means for charging a photosensitive member;
   optical means for projecting an image of the microfilm illuminated by said illuminating means onto the charged photosensitive member;
   measuring means for measuring the amount of light from the microfilm illuminated by said illuminating means;
   developing means for developing an electrostatic latent image formed on said photosensitive member with a positively charged toner or with a negatively charged toner; and
   development control means for selecting the toner to be used for image development in response to the measurement by said measuring means.

9. An image reproducing apparatus according to the claim 8, wherein said development control means comprises means for generating a reference signal, comparator means for comparing the reference signal from said reference signal generating means with the output signal from said measuring means, and means for controlling said developing means in response to the output signal from said comparator means.

10. An image reproducing apparatus according to the claim 9, wherein said reference signal generating means comprises first means for generating a first reference voltage and second means for generating a second reference voltage lower than said first reference voltage, and said control means is adapted to control said developing means in such a manner that the toner to be employed in image development when the voltage given by said measuring means corresponding to the measured light amount exceeds said first reference voltage is opposite in polarity to the toner to be employed in image development when the measured voltage is lower than said second reference voltage.

11. An image reproducing apparatus according to the claim 10, wherein display means is activated when the voltage given by said measuring means corresponding to the measured light amount is positioned between said first and second reference voltages.

12. A reader-printer, comprising:
   illuminating means for illuminating a microfilm;
   first optical means for projecting an image of the microfilm illuminated by said illuminating means onto a screen;

second optical means for projecting the image of the microfilm illuminated by said illuminating means onto a photosensitive member;

charging means for positively or negatively charging said photosensitive member;

measuring means for measuring the amount of light from the microfilm illuminated by said illuminating means; and charge control means for selecting the polarity of charge to be given to said photosensitive member in response to the result of measurement by said measuring means.

13. A reader-printer, comprising:

illuminating means for illuminating a microfilm;

first optical means for projecting an image of said microfilm illuminated by said illuminating means onto a screen;

second optical means for projecting the image of the microfilm illuminated by said illuminating means onto a photosensitive member;

charging means for charging said photosensitive member;

measuring means for measuring the amount of light from the microfilm illuminated by said illuminating means;

developing means for developing an electrostatic latent image formed on said photosensitive member with a positively charged toner or with a negatively charged toner; and development control means for selecting the toner to be employed for image development in response to the result of measurement by said measuring means.

* * * * *

UNITED STATES PATENT AND TRADEMARK OFFICE
CERTIFICATE OF CORRECTION

PATENT NO. : 4,341,463

DATED : July 27, 1982

INVENTOR(S) : Kazuo Kashiwagi et al.

It is certified that error appears in the above-identified patent and that said Letters Patent is hereby corrected as shown below:

ON THE TITLE PAGE

Abstract, line 1, delete "This invention provides an" and insert -- An --;

line 3, delete "by illuminating";

line 4, delete "image and projecting" and insert -- and the --;

same line 4, after "image" insert -- is projected --;

lines 7 and 8, after "member," insert -- a --;

line 10, after "and" insert -- a --;

line 15, after "with" insert -- a --;

line 16, after "selecting" insert -- a --;

line 17, delete "on" and insert -- of --.

Column 1, line 10, delete "an";

line 11, before "is" insert -- process --;

line 13 delete "a" and insert -- the --;

UNITED STATES PATENT AND TRADEMARK OFFICE
CERTIFICATE OF CORRECTION

PATENT NO. : 4,341,463
DATED : July 27, 1982
INVENTOR(S) : Kazuo Kashiwagi et al.

It is certified that error appears in the above-identified patent and that said Letters Patent is hereby corrected as shown below:

Column 1, line 14, after "development" insert -- process --;

line 24, after "polarity" insert -- which is the --.

Column 2, line 32, after "image" insert -- has been --; same line 32, after "as" insert -- being --;

line 39, beofre "same" insert -- the --;

line 41, delete "a" and insert -- the --;

line 51, delete "if" and insert -- whether --;

line 57, after "to" insert -- the --;

line 66, delete "magnitude";

line 59, delete "S" and insert -- S, there is --; same line 59, delete "is";

Column 3, line 16, delete "a", line 16, delete "roller" an insert -- rollers --;

line 20, delete "provided is" and insert -- is provided --;

line 66, delete "41" and insert -- 42 --;

line 68, delete "42" and insert -- 43 --;

UNITED STATES PATENT AND TRADEMARK OFFICE
CERTIFICATE OF CORRECTION

PATENT NO. : 4,341,463　　　　　　　　　　　　Page 3 of 5
DATED : July 27, 1982
INVENTOR(S) : Kazuo Kashiwagi et al.

It is certified that error appears in the above-identified patent and that said Letters Patent is hereby corrected as shown below:

Column 4, line 2, delete "41" and insert -- 42 --;

line 12, delete "41" and insert -- 42 --;

line 13, delete "42" and insert -- 43 --;

line 21, delete "the";

line 23, delete "43" and insert -- 44 --;　same line 23, after "the", second occurrence, insert -- operator of the --;

line 24, delete "to the operator";

line 25, after "Such" insert -- a --;

line 27, delete "41" and insert -- 42 --;

line 34, after "selected" insert -- to be --.

Column 5, line 5, delete "charge" and insert -- charged --;

line 42, delete "112" and insert -- 122 --; same line 42, delete "121" and insert -- 109 --;

line 53, before "case" insert -- the --;

line 57, delete "103", second occurrence, and insert

-- 104 --.

UNITED STATES PATENT AND TRADEMARK OFFICE
CERTIFICATE OF CORRECTION

PATENT NO. : 4,341,463
DATED : July 27, 1982
INVENTOR(S) : Kazuo Kashiwagi et al.

It is certified that error appears in the above-identified patent and that said Letters Patent is hereby corrected as shown below:

Column 7, line 9, delete "43" and insert -- 44 --;

line 22, delete "on" and insert -- of --;

lines 25 and 26, delete "allows to automatically" and insert -- enables the automatic --;

line 26, delete "provide" and insert -- provision of --.

Column 7, Claim 1, line 3, delete "therein" and insert -- thereon --;

Claim 3, line 63, delete "being" and insert -- is --;

line 68, after "to", second occurrence, insert -- the --.

UNITED STATES PATENT AND TRADEMARK OFFICE
CERTIFICATE OF CORRECTION

PATENT NO. : 4,341,463
DATED : July 27, 1982
INVENTOR(S) : Kazuo Kashiwagi et al.

It is certified that error appears in the above-identified patent and that said Letters Patent is hereby corrected as shown below:

Column 8, Claim 6, line 12, delete "1" and insert -- 2 --.

Signed and Sealed this

First Day of March 1983

[SEAL]

Attest:

*Attesting Officer*

GERALD J. MOSSINGHOFF
*Commissioner of Patents and Trademarks*